J. F. Ward,
Pipe Coupling.
N°. 39,691.                           Patented Aug. 25, 1863.
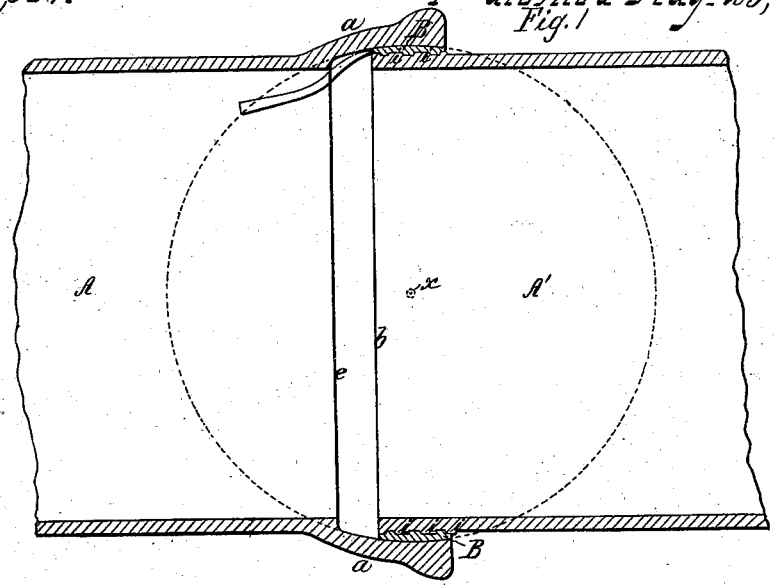
Fig. 1
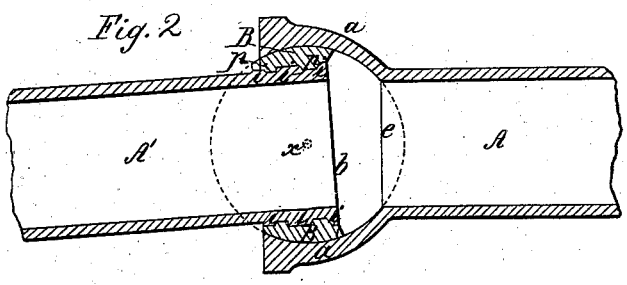
Fig. 2
Fig. 3
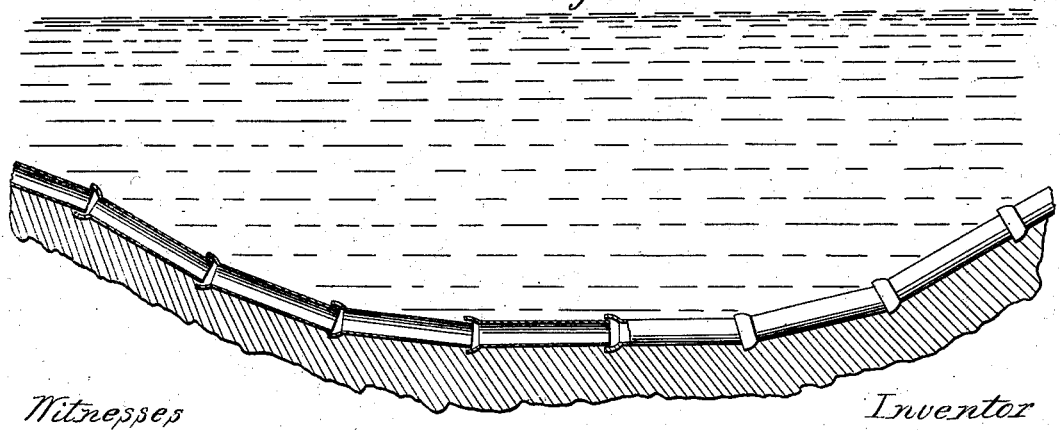
Witnesses
Charles E. Foster
Charles Howson
Inventor
Henry Howson
Att'y for J. F. Ward

UNITED STATES PATENT OFFICE.

JOHN F. WARD, OF PHILLIPSBURG, NEW JERSEY.

IMPROVEMENT IN PIPE-COUPLINGS.

Specification forming part of Letters Patent No. 39,691, dated August 25, 1863; antedated July 15, 1863.

*To all whom it may concern:*

Be it known that I, JOHN F. WARD, of Phillipsburg, Warren county, New Jersey, have invented a new and Improved Pipe-Joint; and I do hereby declare the following to be a full, clear, and exact description of the same, reference being had to the accompanying drawings, and to the letters of reference marked thereon.

My invention consists in forming the joints for water and gas pipes in the peculiar manner described hereinafter, with the view of laying them with facility across rivers and creeks, or other places difficult of access, and allowing them to adjust themselves to uneven beds of the same without impairing the joints.

In order to enable others to practice my invention, I will now proceed to describe the manner of carrying it into effect.

On reference to the accompanying drawings, which form a part of this specification, Figure 1 represents, in section, my improved joint as applied to pipes of large diameter; Fig. 2, the same, as applied to pipes of smaller diameter; and Fig. 3 illustrates the manner in which pipes accommodate themselves to the bed of a river or creek.

A and A' represent the ends of two pipes connected together by my improved joint, the end of the pipe A consisting of a socket, $a$, the inside of which represents a section of a sphere, shown by the red circle, of which the point $x$ is the center.

The end of the pipe A' is straight and plain, with the exception of the bands or collars $i\ i$, the object of which will be rendered apparent hereinafter.

The spherical interior of the socket $a$ is so much larger than the end of the pipe A' that an annular space shall intervene between the two for the reception of a mass, B, of lead or other suitable material, which is introduced in a molten state in a manner similar to that practiced in forming ordinary lead joints for pipes.

The spherical interior of the socket $a$ is of such an extent, and the end of the pipe A' penetrates the socket to such a limited distance, that there shall be a space of proper dimensions between the end $b$ of the pipe A' and the termination $e$ of the socket for a purpose explained hereinafter.

In laying the pipes across the bed of a river or creek, they are, in the first instance, placed on suitable vessels, and there connected together by the introduction of molten lead between the socket of one pipe and that portion of the adjacent pipe which penetrates the socket. After pipes extending the desired length have been thus connected together, the vessels are withdrawn, and the pipes are allowed to sink to the bed of the river, as shown in Fig. 3.

As the lead packing is securely confined to the end of the pipes A' by the bands or collars $i\ i$, and as the lead fits accurately to the spherical interior of the socket $a$, a ball-and-socket joint is formed, and the lead carried on the ends of the pipes A' will move with the latter in the sockets as the pipes sink and adjust themselves to the uneven bed of the river. In pipes of smaller diameter this movement will in no way impair the efficiency of the packing, but in pipes of larger dimensions and greater weight the lead will in some instances be strained and the packing injured. A remedy for this is afforded by the extent of the spherical interior of the socket, and by the space presented between the termination $e$ of the socket and the end of the pipe, which penetrates the same, as this space in pipes large enough to admit a man permits him to calk the packing on the inside by means of a suitable instrument, (see Fig. 1,) and to prevent any leakage which may have been caused by the tearing or disintegration of the lead packing.

Without claiming, broadly, the connecting together of pipes by ball and-socket joints, I claim as my invention and desire to secure by Letters Patent—

The end of the pipe A', with its bands $i$, and recesses $p\ p$, or their equivalents, and packing B, when applied to the spherical interior of the socket $a$ of an adjacent pipe, A, substantially as and for the purpose herein set forth.

In testimony whereof I have signed my name to this specification in the presence of two subscribing witnesses.

JOHN F. WARD.

Witnesses:
P. R. HAGEMAN,
W. H. CHAPIN.